Oct. 13, 1953        P. K. ANDERSON        2,655,432
PROCESS FOR PRODUCING COPPER OXYCHLORIDE

Original Filed March 12, 1947        3 Sheets-Sheet 1

INVENTOR.
PHILIP K. ANDERSON.
BY
His ATTORNEYS.

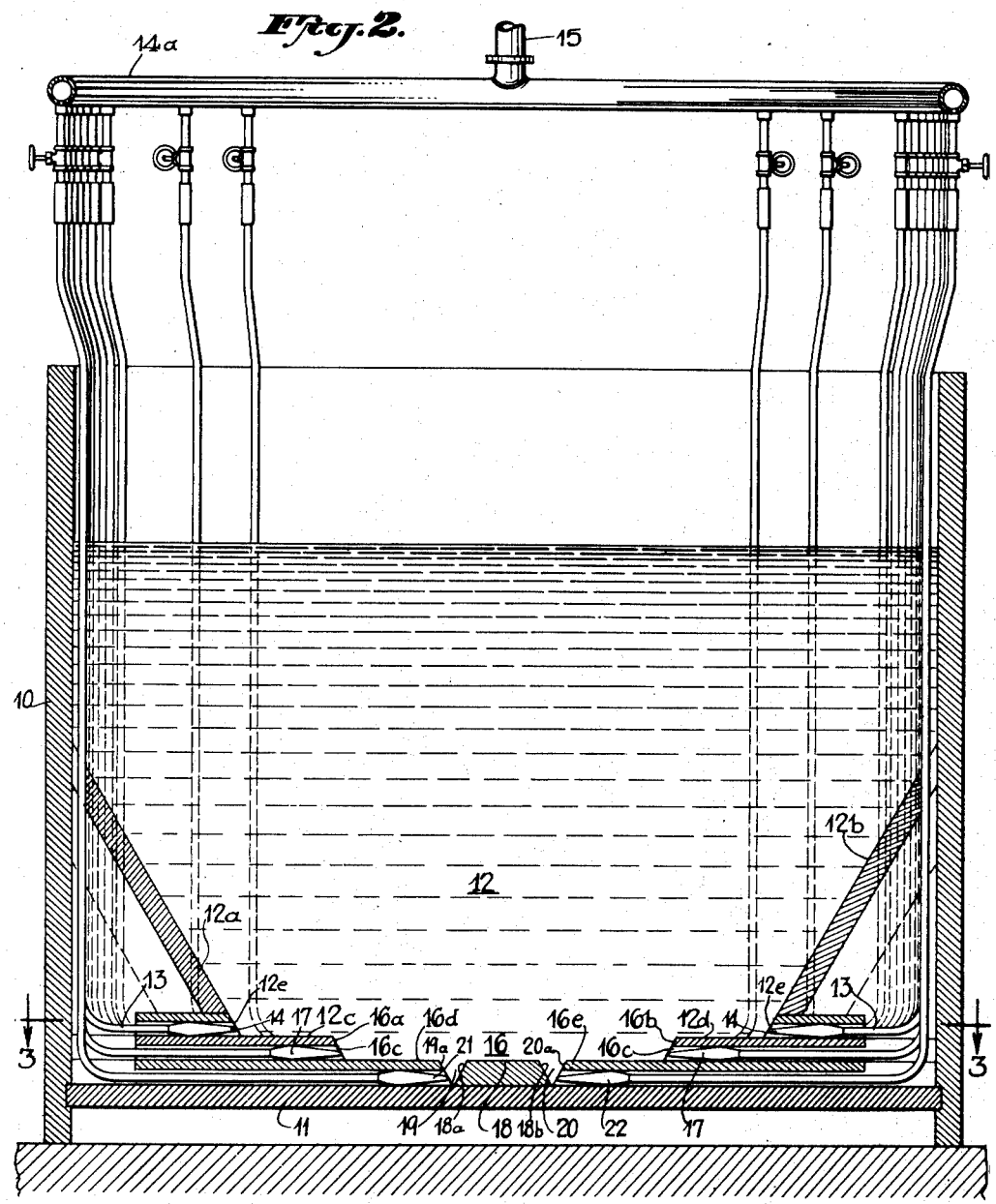
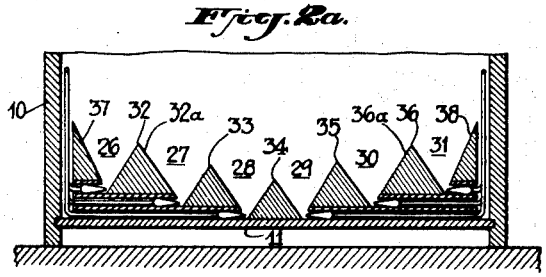

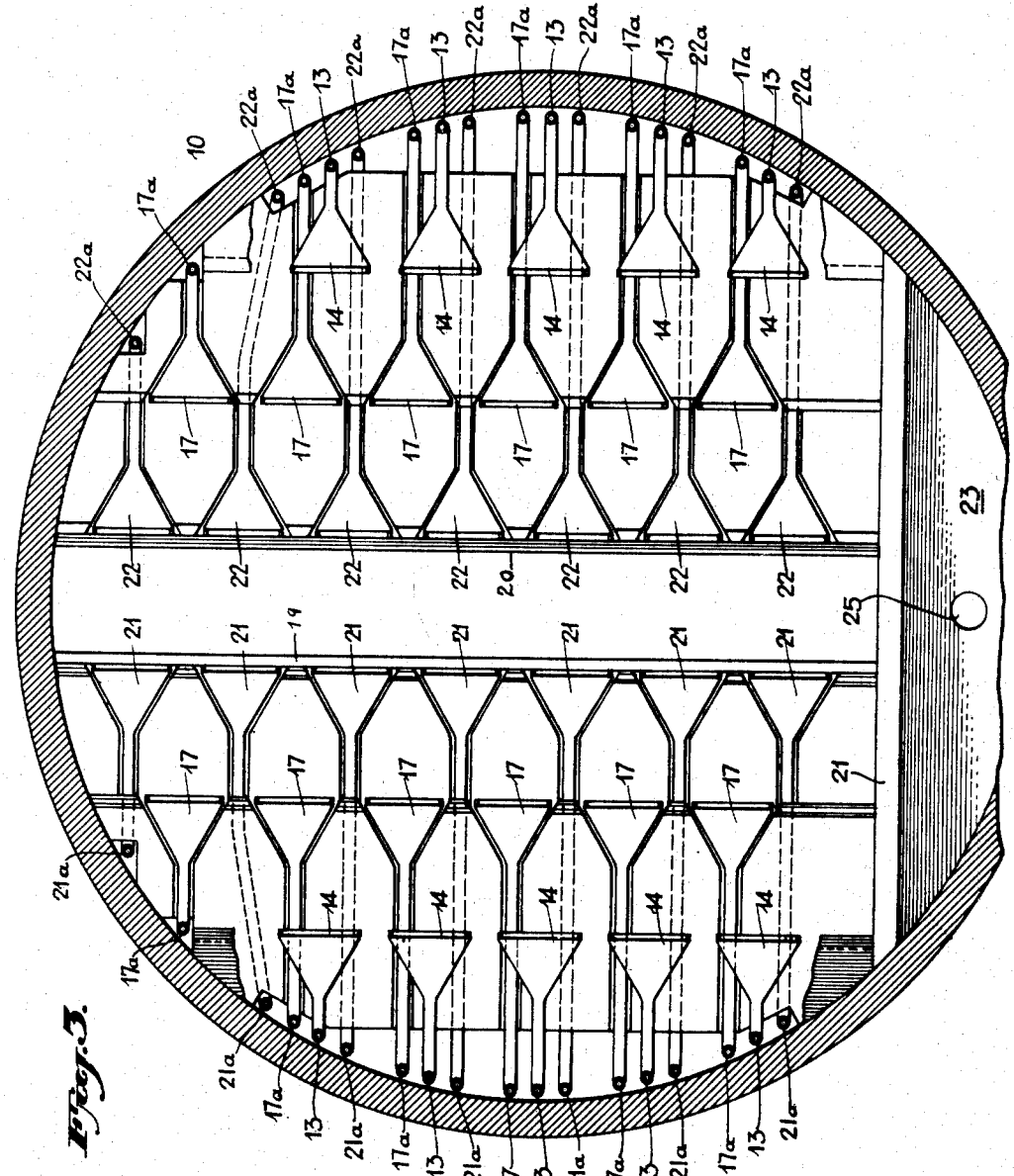

Patented Oct. 13, 1953

2,655,432

UNITED STATES PATENT OFFICE 2,655,432

PROCESS FOR PRODUCING COPPER OXYCHLORIDE

Philip Kenneth Anderson, Rahway, N. J., assignor to The American Metal Company Ltd., New York, N. Y., a corporation of New York Original application March 12, 1947, Serial No. 734,014. Divided and this application June 20, 1952, Serial No. 294,761

4 Claims. (Cl. 23—203)

This invention relates to vessels or containers, and more particularly to means for facilitating the aeration of liquids and solids contained in a vessel.

This application is a division of application Serial No. 734,014, filed March 12, 1947, now United States Patent No. 2,624,657.

My apparatus is particularly adapted to the manufacture of complex compounds of copper such as copper oxychloride though not restricted thereto. Such compounds have been produced in the past by introducing metallic copper into a solution of ammoniacal calcium chloride and aerating same in a reaction vessel. Copper oxychloride is but one of many complex compounds of copper oxide and calcium chloride which have been found useful, for example, as fungicides. Many attempts have been made to produce these compounds at sufficiently low cost to make them commercially feasible.

The principal factor controlling the production rate of copper oxychloride, when the latter is produced by the above mentioned process of aeration of copper in calcium chloride and ammonium chloride, has been the rate of dissolution of the metallic copper. The exact chemical reactions involved in aerating metallic copper in a solution of calcium and ammonium chloride are not accurately known, but it is believed that the air oxidizes the copper to form copper oxychloride.

Processes and apparatus have been heretofore proposed for making copper oxychloride, for example, as shown in Haag et al. U. S. Patent 2,358,706, dated September 19, 1944. I designate such material produced by said patent as copper oxychloride although the patentee states that such compounds "may be designated for convenience of reference 'calcium cuproxy chlorides,' although by such a designation the particular structural formula or a particular degree of hydration is not meant to be ascribed." But up to now, such attempts to make copper oxychloride have been of restricted importance and largely have been unsuccessful because the rate of production in comparison to the size of the investment for the equipment is so low that the unit cost of the product has been high.

Other reaction vessels for making copper oxychloride have been proposed. They included air outlets or orifices which did not permit proper contact between the air, copper and reagents either because the air currents were not properly placed or the copper oxychloride settled on the copper and prevented further reaction.

According to the present invention, an object is to provide novel apparatus for overcoming the above difficulties.

The above and further objects and novel features will more fully appear from the detailed description when the same is read in connection with the accompanying drawings. It is to be expressly understood, however, that the drawings are for purposes of illustration only and are not intended as a definition of the limits of the invention, reference for this latter purpose being had to the appended claims.

In the drawings, wherein like reference characters refer to like parts throughout the several views:

Fig. 2 is a sectional view taken on line 2—2 of Fig. 1;

Figure 1:
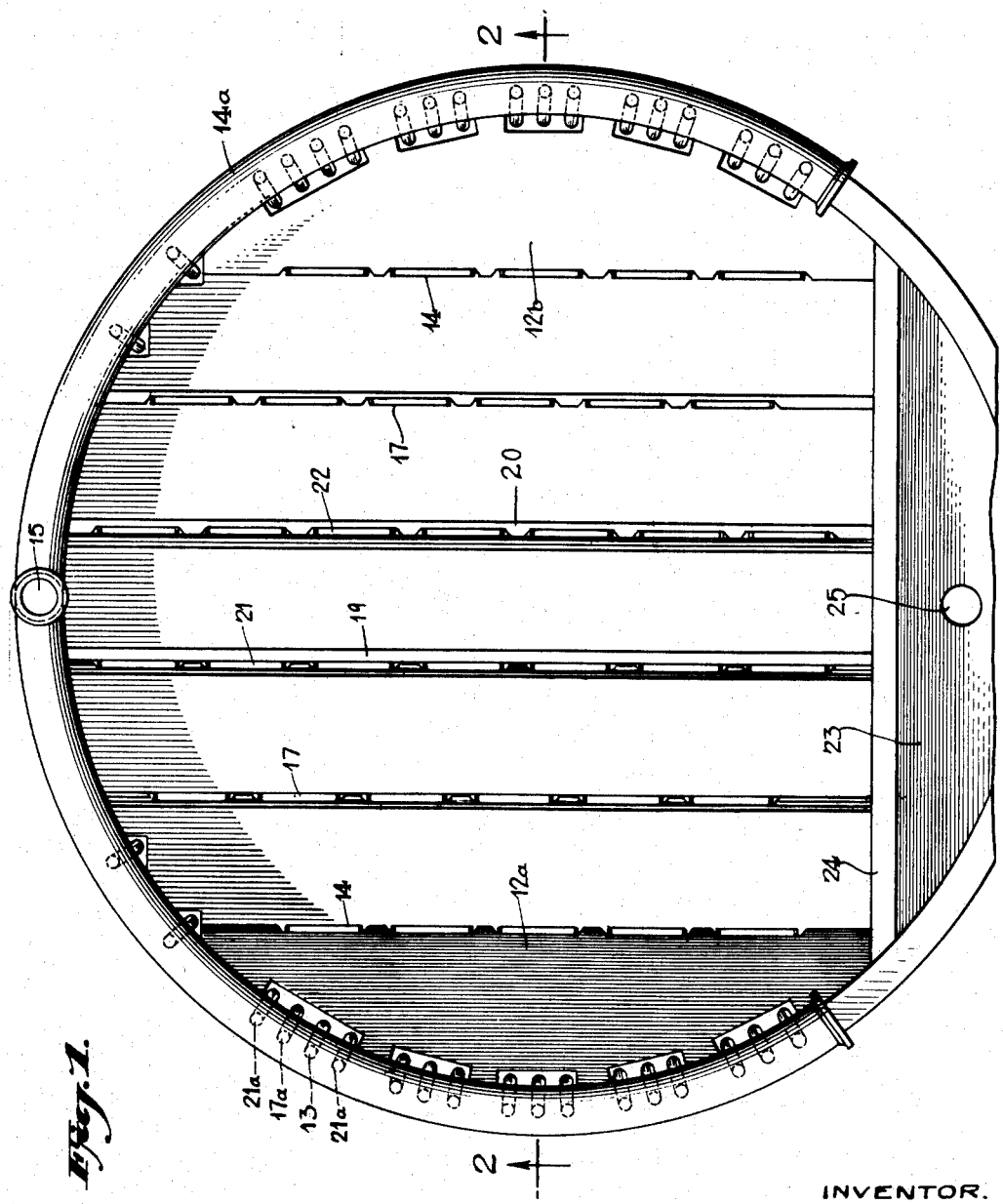
Fig. 1 is a top plan view of one embodiment of the invention.

Fig. 2a is a vertical sectional view, partly in section and with parts broken away, of a reaction tank illustrating a second embodiment of the invention; and Fig. 3 is a sectional view taken on line 3—3 of Fig. 2, showing a particular bank of conduits for an aerating medium at the level of line 3—3, and also showing other banks of conduits at levels below line 3—3.

The forms of the invention illustrated in the accompanying drawings, by way of example, comprise a reaction tank or vessel for the production of copper oxychloride wherein pieces of copper are acted upon by a calcium chloride and ammonium chloride liquor and by air. Streams of the latter are directed into the vessel at or near the bottom thereof and pass in contact with the copper. The bottom of the novel vessel is provided with a plurality of steps which are so disposed relative to one another that a gaseous medium such as air directed into the container through the sides or faces of the steps will contact freely and effectively any metallic copper situated upon the steps. Any material which is capable of settling to the bottom of the vessel is directed into direct contact with the air. With respect to metallic copper this aids the chemical action and dissolution thereof. With respect to the precipitate (copper oxychloride) which tends to settle as a slurry, the novel bottom directs same into the aerating stream which recirculates it and keeps it in suspension. The novel stepped bottom of the tank may also be described as comprising a plurality of troughs into which an aerating medium is directed through the sides or bottoms of the troughs. Any material which settles to the bottom is directed by means of the troughs into direct contact with an air stream.

The concentration of the reaction liquor may vary widely. Of course, it is generally desired to maintain concentrations which will induce maximum reaction or dissolution rates of copper. In general, in the present invention, a liquor is used having a gravity varying between 5° and 25° Baumé measured at about 20° to 30° C. The weight ratio of calcium chloride to ammonium chloride may vary from about 4 to 1 to about 6 to 1. It has been found preferable to have a gravity of between 17° to 20° Baumé and a weight ratio of calcium chloride to ammonium chloride of about 5 to 1.

The rate of aeration should be the maximum possible without causing undesirable or excessive splashing. In the embodiments of the invention described herein, it has been found desirable to employ air at a rate of between 10 C. F. M. to 15 C. F. M. for each square foot of bottom area of the reaction vessel. More specifically about 12.5 C. F. M. are employed for each square foot of bottom area in the present invention.

One of the disadvantages of prior reaction tanks is that large inactive regions exist between air conduit outlets which permit the building up of metallic copper coated with slurry (settled copper oxychloride) thus decreasing the productive capacities of the tank by decreasing the areas of copper exposed to the aerating stream and to the reaction liquor.

Novel means are provided in accordance with my invention for eliminating any inactive regions and attaining a superior distribution of air at greater uniformity than heretofore suggested. Said novel means also effect a continued suspension of the product (copper oxychloride) and promote a maximum production by continuously exposing the metallic copper to streams of air.

I provide a novel reaction-promoting bottom surface comprising a plurality of steps preferably having inclined faces and horizontal treads. The aerating fluid is directed preferably to sweep across the treads. The steps preferably occupy the entire bottom of the reaction tank and any metallic copper in the tank must fall upon some one of the treads where it is in direct contact with an air stream. The same is true of the precipitate or slurry which may tend to settle and to coat the metallic copper. That is, the copper oxychloride may tend to settle but will fall upon one of said treads and be violently agitated by an air stream directed thereacross whereby it will be urged upwardly and away from a settled condition. Thus a fouling or covering of the metallic copper by the precipitate is avoided.

In the form of the invention shown in Figs. 1, 2, 2a and 3, the novel reaction tank is constituted by a vessel which may be, for example, five feet in depth with a diameter of 6 feet. Such a vessel is indicated at 10 in the accompanying diagram and preferably is of wood having a bottom 11 also of wood.

As shown in Fig. 2, I provide a bottom comprising a plurality of steps, there being in this particular embodiment two sets of steps which face one another and which step upwardly and away from a common diameter of the bottom of the tank.

The treads of, for example, the left hand set of steps as viewed in Fig. 2, are shown at 16d and 12c. The faces of said steps are respectively shown at 16a and 12a which preferably are slightly inclined.

The right hand set of steps, on the other hand, comprises treads 16e and 12d having faces 16b and 12b respectively.

The faces 12a, 12b are of greater area than faces 16a, 16b and preferably extend outwardly to the inner vertical surfaces of the tank and are fitted thereto.

An island portion 18 may be interposed if desired between the left and right hand sets of steps and may form small troughs 19 and 20 respectively therewith. Troughs 19 and 20 preferably have inclined sides or faces as at 18a, 19a and 18b, 20a which converge inwardly and downwardly.

The aerating medium is directed into the container through orifices preferably in the faces 12a, 16a, 19a and 12b, 16b, 20a. A plurality of nozzles 14 of the so-called sweep variety in faces 12a, 12b are adapted for directing air in a sweeping action over the entire areas of treads 12c, 12d respectively. Nozzles 17 are similarly situated relative to treads 16d, 16e, and nozzles 21 and 22 direct air into the bottoms of troughs 19 and 20 respectively through orifices in sides 19a, 20a.

A somewhat different conception of the invention is found by considering the above described steps as forming a plurality of superposed troughs. For example, as shown in Fig. 2 a plurality of superposed troughs are provided having inclined sides and having mouths or horizontal openings which are in communication with the trough next above it. The troughs, in the form shown, are co-extensive with the bottom area of the tank.

Intense aeration of the calcium chloride liquor may be attained by directing air into the troughs by means of nozzles situated preferably adjacent the bottoms thereof. It is desirable, in the form shown in Figures 1, 2 and 3 to employ opposed air streams which are directed toward one another from opposite sides of the troughs and which are adapted for sweeping the lower surfaces or bottoms thereof.

As shown in Fig. 2, a primary trough 12 is constituted by a pair of inclined side portions 12a, 12b which are angularly disposed relative to the vertical axis of the tank and converge downwardly, that is, the mouth of the trough flares upwardly and outwardly, thereby causing any solid matter in the tank which strikes said sides to slide downwardly toward the center of the reaction vessel.

The above mentioned side portions 12a, 12b are fitted to the cylindrical inner surface of the tank as shown in Fig. 1. The bottom of the primary trough 12 is indicated at 12c, 12d and preferably constitutes flat horizontal surfaces.

The aeration medium such as air is conducted into the primary trough 12 by suitable conduits as at 13 which pass down the inner vertical sides of the vessel and are, as here shown, in communication with a manifold 14a situated preferably above the reaction vessel. The manifold 14a may be connected by means of a master conduit 15 to a suitable source of compressed air which may be controlled by suitable pumping means.

It is desirable in order to accomplish a complete and effective distribution of air over the floor or bottom of the primary trough to employ suitable nozzles which will increase the discharge velocity of the air and in effect squirt same over said trough floor. Such nozzles preferably are disposed as at 14 (Fig. 3) on opposite sides of the trough along the bottom thereof within orifices 12e. In the form shown, a dovetailed nozzle, preferably of lead, may be employed, for example, having about six inch sides. They may be secured to the conduits 13 in any suitable manner. The conduits 13, for example, may have an inner diameter of ½″. The nozzles 14 preferably have discharge orifices which, for example, are about 6″ in length and about 1/16″ in width.

The nozzles 14, 17 and 22 are preferably closely spaced whereby about 90% of the length of each side of the trough along the bottom thereof is directly supplied with air. Those nozzles, for example, adjacent side 12a are adapted for sweeping air over the bottom portion 12c and the opposite group of nozzles adjacent side 12b are adapted for sweeping air over the bottom portion 12d.

A secondary trough is provided at 16 having sides 16a and 16b. The mouth of the secondary trough 16 is formed in the bottom of the primary trough 12. The sides 16a and 16b are preferably inclined substantially parallel and in spaced relation to the sides 12a and 12b of trough 12 and have formed therein a plurality of orifices 16c through which air is directed into the trough 16. A plurality of nozzles 17 are provided on opposite sides of the trough 16 along the bottom thereof which are adapted for directing air across the portions 16d and 16e comprising respectively the left and right hand bottom areas (Fig. 2) of trough 16. The opposed air streams from the nozzles 17 may meet and jointly aerate the central portion of the bottom of trough 16 indicated at 18. Thus the entire floor of the trough 16 may be fully aerated by the action of the air issuing from the nozzles 17.

In order further to promote proper aeration, additional troughs may be formed with the mouths thereof in the bottom of the trough 16 as at 19 and 20. These two troughs 19, 20, in the form shown, are considerably smaller than the troughs thereabove at 12 and 16. In the embodiment shown in Figs. 1, 2 and 3 the troughs 19, 20 preferably are of triangular cross-section, that is, of V-shaped cross-section with the open end of the V comprising the mouth of the trough.

Air preferably is directed into the trough 19 and 20 through nozzles 21 and 22 respectively (Fig. 3). The nozzles 21 and 22 are analogous to the nozzles 14 and 17. Suitable orifices for the nozzles 21 and 22 may be formed within the inclined sides of the troughs 19 and 20 as shown in Fig. 2.

As is well illustrated in Fig. 2, streams of aerating gas such as air are directed into the vessel 10 laterally thereof by means of horizontal nozzles, thereby minimizing the possibility of clogging or closing the air nozzles with metallic copper or slurry.

The nozzles 17, 21 and 22 are respectively connected to conduits 17a, 21a and 22a which are in communication with manifold 14a in a manner analogous to conduit 13.

As illustrated in Figs. 1 and 3, nearly the entire bottom region of the reaction vessel 10 is employed for a reaction chamber, i. e., about 90% thereof is so employed. A small compartment within the tank is formed at 23 for other than reaction purposes by means of a partition 24 which preferably is of perforated wood. The partition 24 is designed to protect tank outlet 25 from being clogged by metallic copper which is placed within the reaction portion of the vessel.

A second embodiment of the invention is illustrated in Fig. 2a comprising a plurality of parallel troughs each having preferably a V-shaped cross-sectional area. Such parallel troughs may be formed, for example, by suitable wooden members or timbers of triangular cross-sectional shape. Fig. 2a illustrates six such troughs as at 26—31 inclusive. These troughs may be formed by, for example, five parallel wooden members 32—36 inclusive which preferably are of equilateral triangular cross-sectional shape each having an edge of about 8″. Members 37, 38 may be provided which complete the troughs acting in cooperation respectively with the triangular members 32 and 36.

If desired, the bases of all of the above mentioned wooden members 32—36 and 37, 38 may be placed flush upon the bottom 11 of the tank 10. However, it is preferable for said members to be stepped in the manner shown in Fig. 2a, for example, wherein the central member 34 only is upon said bottom 11 and successive pairs of such members are placed upon successively higher levels. For example, the pair 33, 35 may be secured at a first level. The pair 32, 36 may be secured at a second level and the outer members 37, 38 may be secured at a third and higher level.

By means of the stepped arrangement of the above described members 32—36 and 37, 38, it is possible to eliminate the exposure of and increase the number of air conduits which pass parallel to the bottom 11 and beneath all of said members except 34. For example, as shown in Fig. 2, the horizontal portions of the air conduits at the various levels are in stepped relationship whereby exposure of the horizontal portions thereof are eliminated.

Conduits having nozzles may be directed into the troughs of the embodiment of Fig. 2a in a manner analogous to that shown in Fig. 2.

One advantage of the embodiment of Fig. 2 over that of Fig. 2a has been found to be in the ease of cleaning same.

In the operation of the reaction vessel described above, it periodically becomes necessary to clean the residue therefrom. This is constituted by undissolved copper and by waste material. It has been found much more convenient to clean the bottom of the tank illustrated in Fig. 2 than the bottom illustrated in Fig. 2a, largely because of the horizontal flat bottoms of the troughs shown in the former figure. Moreover, better access is attained to the horizontal sections of the air conduits and the nozzles therefor.

In the form of the invention shown, for example, in Figs. 1 and 3, the steps and troughs are generally of oblong shape and are parallel. However, of course, it is possible to have troughs or basins of circular conformation rather than oblong. Moreover, instead of employing the trough arrangement of Fig. 2 wherein the bottom is stepped upwardly from the center thereof on each side of said center, it is possible to commence said step at one side of the reaction vessel, for example, the left side as viewed in Fig. 2, and the steps may progressively rise therefrom to the right side of the container as viewed in said Fig. 2.

The operation of the reaction vessel in general in accordance with my invention may be as follows: Copper scrap, for example, as blocks of compressed copper wire, are placed in the troughs. A reaction liquor of the same concentration and volume as above described is added and subjected to aeration preferably at a rate of 350 cubic feet per minute or about 12½ cubic feet for each square foot of bottom area.

Employing a "semi-continuous" method of operation wherein a predetermined part of the liquor and product, such as 20% to 40%, is periodically withdrawn and additions of liquor and copper are periodically made, a high average output capacity for a single tank is secured.

The operation of the embodiment of Fig. 2 is analogous to that of Fig. 2a in that any settling of the product or precipitate (copper oxychloride) is directed to the bottom of a trough. For example, to the flat surface 12c which constitutes a portion of the bottom of trough 12. The air stream issuing from the nozzle 14 will immediately agitate and recirculate the precipitate. Also, any metallic copper upon said surface 12c will be subjected to the air stream which sweeps thereacross and thereby is in direct contact with the metal, thus aiding in the chemical reaction with the liquor and preventing a coating of said metallic copper by the slurry or precipitate.

While the invention has been described with respect to certain preferred examples which have given satisfactory results, it will be understood by those skilled in the art after understanding the invention that various changes and modifications may be made without departing from the spirit and scope of the invention, and it is intended, therefore, in the appended claims to cover all such changes and modifications.

What is claimed as new and is desired to be secured by Letters Patent is:

1. A process for producing copper oxychloride comprising, causing a liquor made up of calcium chloride and ammonium chloride to react with pieces of metallic copper of substantial size in an aqueous solution in a reaction vessel, aerating said solution by directing a plurality of air streams therein at a plurality of levels near the bottom of the vessel, withdrawing at predetermined intervals a portion of the contents of the vessel, replacing the withdrawn contents with metallic copper and substantially an equal volume of said liquor, and filtering out copper oxychloride from the contents withdrawn from the vessel.

2. A process for producing copper oxychloride comprising, causing a liquor made up of calcium chloride and ammonium chloride to react with pieces of metallic copper in an aqueous solution in a reaction vessel, the solution containing approximately four to six parts calcium chloride and one part of ammonium chloride, aerating said solution by directing a plurality of air streams therein at a plurality of different levels adjacent the bottom of the vessel, periodically withdrawing from about one-fifth to two-fifths of the contents of the vessel, replacing the contents withdrawn with copper and substantially an equal volume of said liquor, and filtering out copper oxychloride from the contents withdrawn from the vessel.

3. A process for producing copper oxychloride comprising, causing a liquor made up of calcium chloride and ammonium chloride to react with pieces of metallic copper of substantial size in an aqueous solution in a reaction vessel, aerating said solution by directing a plurality of air streams forcefully therein at a plurality of levels near the bottom of the vessel, such copper oxychloride forming a slurry in such vessel which tends to settle, one or more of such streams striking said metallic copper with force sufficient to remove slurry which has settled thereon, withdrawing at predetermined intervals a portion of the contents of the vessel, replacing the withdrawn contents with metallic copper and said liquor, and filtering out copper oxychloride from the contents withdrawn from the vessel.

4. A process for producing copper oxychloride comprising, causing a liquor made up of calcium chloride and ammonium chloride to react with pieces of metallic copper of substantial size in an aqueous solution in a reaction vessel, aerating said solution by directing a plurality of air streams forcefully therein at a plurality of levels near the bottom of the vessel, said streams forcefully striking said copper, withdrawing at predetermined intervals a portion of the contents of the vessel, replacing the withdrawn contents with metallic copper and said liquor, and filtering out copper oxychloride from the contents withdrawn from the vessel.

PHILIP KENNETH ANDERSON.

References Cited in the file of this patent

UNITED STATES PATENTS

| Number | Name | Date |
|---|---|---|
| 2,162,091 | Kuss et al. | June 13, 1939 |
| 2,358,706 | Haag et al. | Sept. 19, 1944 |

FOREIGN PATENTS

| Number | Country | Date |
|---|---|---|
| 413,722 | Great Britain | July 11, 1934 |
| 349,232 | Italy | June 9, 1937 |